Nov. 30, 1943.   W. C. REA   2,335,791
DETACHABLE BIT AND METHOD OF MAKING THE SAME
Filed June 17, 1939
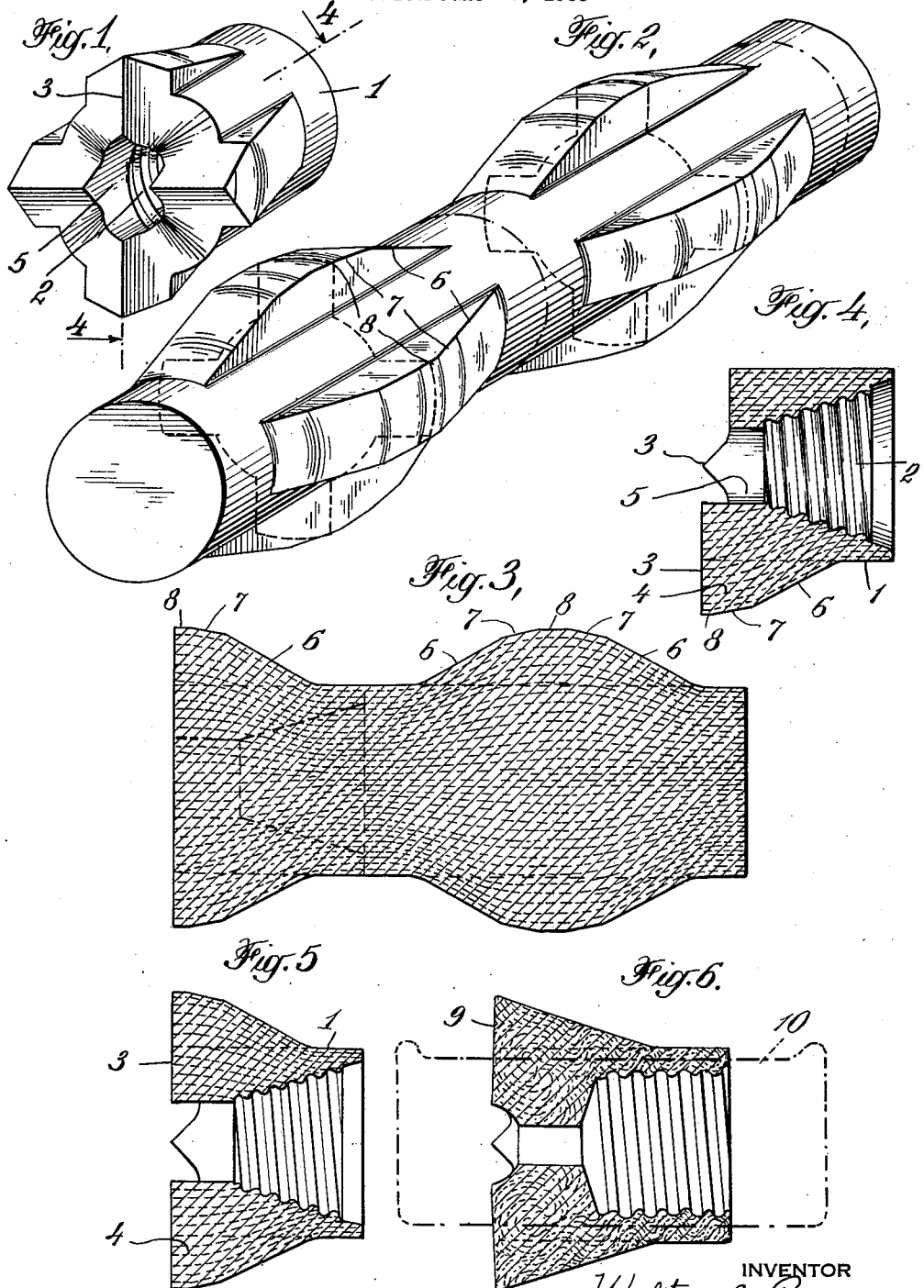
INVENTOR
Walter C. Rea
BY
Pennie Davis Marvin Edmonds
ATTORNEYS Patented Nov. 30, 1943

2,335,791

UNITED STATES PATENT OFFICE 2,335,791

DETACHABLE BIT AND METHOD OF MAKING THE SAME

Walter C. Rea, Kew Gardens, N. Y., assignor to Detachable Bit Company, New York, N. Y., a corporation of Delaware Application June 17, 1939, Serial No. 279,752

3 Claims. (Cl. 76—108)

This invention relates to improvements in detachable bits for rock drills and constitutes a continuation in part of my application for Method of making detachable bits, Serial No. 260,-715, filed March 9, 1939. As disclosed in said prior application, such bits comprise an internally threaded sleeve of a diameter smaller than the hole to be drilled with an enlarged cutting portion with its end shaped and hardened to form the cutting face of the bit. It has been the universal practice heretofore followed in making such drills to use as stock, round rods of steel of the desired composition and of a diameter no larger than the diameter of the shank of the bit. The first step in the process is to heat the end of the steel rod, cut off a piece of the desired length and then enlarge the piece at one end by a forging operation, usually by pressure or impact applied axially against the heated end of the piece to thereby expand it at that end to the desired diameter for the cutting face. The pressure or impact against the end of the rod may be applied through a shaping tool so as to expand the metal of the rod and at the same time shape the end face of the rod to form the cutters at one operation.

The forged detachable bits, while greatly superior to the old style bits, formed by shaping a cutting edge directly on the end of the drill rod, have certain defects due to the fact that in the forging operation the grain structure of the metal is distorted in a manner which increases the likelihood of breakage of the bits and also makes their wearing qualities most uncertain. As such defects are also present to a large extent in the old style of bits produced by directly forging the end of the drill steel, the forged detachable bits have during the last six or eight years enjoyed an extensive and increasing sale, but there is nevertheless marked room for improvement in this respect in the detachable bits of today.

In my above-mentioned pending application I have described certain methods of producing bits by metal working machinery from bars of previously shaped cross-section. The above-mentioned application is directed primarily to the new process of manufacture, wherein bits of greatly improved quality over the bits produced by the forging methods heretofore employed are produced at a lower manufacturing cost, so the present application is directed to such bits as new articles of manufacture.

In the accompanying drawing I have illustrated my improved detachable bits in comparison with bits produced by the usual forging operation. In said drawing:

Figure 1 shows in perspective the completed bit as made from the blank of Fig. 2 by the procedural steps described in my co-pending application;

Fig. 2 represents the specially shaped bar of steel from which the bits are made;

Fig. 3 shows the bar in longitudinal section.

Fig. 4 is a sectional view along the broken line 4—4 of Fig. 1.

Fig. 5 is a longitudinal sectional view of the bit showing the grain structure resulting from the rolling operation employed in shaping the stock from which the bits are made; and Fig. 6 is a similar longitudinal sectional view of a bit of the same shape but made by the previously employed forging operations.

The bar of steel shown in Fig. 2 is rolled for the manufacture of bits according to the procedure described in my co-pending application, from bar stock of uniform diameter, in such manner that the grain of the steel resulting from the rolling operation follows substantially the outer contour of the bar.

The shape of the bar shown in Fig. 2 is one that has been found suitable for the popular "cross" configuration of cutting face. For other types of cutting faces the shape of the bar would necessarily be somewhat altered. A finished bit of the cross type is shown in Fig. 1, and comprises a sleeve 1 with an internal thread 2, usually a left-hand thread, so that the bits will be tightened and not loosened by a rotation to the right in the drilling operation. Any of the types of threads now used for forged bits may be employed, but for the reasons hereinafter stated the tapered thread (see Fig. 4) is preferred.

The cutters 3 of the bit are formed on the end faces of the wings 4 projecting radially from the body of the bit. In the type of bit here illustrated there are four diametrically opposed wings forming the familiar cross shape design. Between the wings 4 the diameter of the bit is the same as the diameter of the sleeve, to thereby form channels through which the dust and fragments resulting from the cutting operation are discharged by the compressed air or water delivered to the cutting face through the central hole 5.

The shape of the wings which we have found advantageous for bits of this type comprise an upper tapered portion 6 which blends into a second tapered portion 7 of less taper, that is, its outer circumferential surface is more nearly parallel to the cylindrical sleeve 1. This second tapered portion 7 blends into a third narrow portion of such slight taper as to be substantially cylindrical. By this construction the outer tips of the cutters are backed up by a substantial amount of metal which greatly reduces the wear and breakage at this point.

As will be observed from Fig. 3, wherein the grain of the steel is indicated by the shading of the portion of the drawing shown in cross-section, the grain of the bar extends throughout its length longitudinally of the bar. In the portions of small diameter the grain is parallel to the axis of the bar throughout the entire cross-section of the bar, while in the wing portions of larger diameter the grain at the center is parallel to the axis and gradually spreads out to follow the contour of the wings at the outer surface.

The grain structure resulting from the rolling operation is carried over into the bit when made by the process described in my co-pending application and produces a bit which is much less liable to breakage than bits made by the old forging operation. The weakest point of the bit selected for illustration is at the ends of the cutting wings, and the breakage of most usual occurrence is the breaking off of the corners of the wings.

The bit is weakest at this point and also the amount of cutting to be done is greatest. One corner broken off reduces the effectiveness of the bit to such an extent that it is better to remove it at once. One broken corner reduces the cutting effectiveness by 25% so that the unbroken cutters rapidly become dull at the corners—or break off. When this occurs the diameter of the cutter is smaller than the diameter of the bit across the wings and the bit can no longer be used even though the cutters throughout the major portion of their length are still sharp enough to be serviceable.

The bit of the present application is much less subject to breakage than the old style bits for the reason that the force of the impact is in the direction of the fibres of the steel and not in a direction inclined to or transverse of the fibres.

Another marked advantage of the bits made from steel shaped by rolling instead of forging is that the cutting face of the bit will be throughout of substantially uniform texture and density, whereas in the forged bit the grain structure and density vary widely in different parts of the cutting face. This will be best understood by considering the effect on the grain structure of the bit when the end of the rod from which the bit is made is expanded by impact or pressure exerted axially of the rod.

In Fig. 6 the grain of a typical forged bit is illustrated. As will be understood, the bars from which the bits are made by the old method of operation are rolled to uniform diameter and consequently the rod section, before it is forged to produce the bit, is of uniformly longitudinal grain structure similar to the grain structure of the portions of reduced diameter in the shaped rod employed for making the bits of this application. In shaping the bits by the old method, the end of the rod is heated and a section cut off which is then pressed or hammered into the desired shape. Ordinarily the rods are of a smaller diameter than the threaded sleeve portion of the bit. A rod section of typical dimension is shown in dotted lines in Fig. 6. Usually in cutting the hot metal by the ordinary shears a lip or enlargement is formed at one side as indicated.

The heated cut-off sections are then pressed or hammered into the desired shape by pressure applied to the ends of the sections and hence in the direction of the length unavoidably producing a bending and distortion of the fibres. As indicated in Fig. 6, it has been found on cutting sections through these forged bits and etching the cut surface to bring out the grain structure, that the uniform longitudinal grain structure has been completely destroyed. In the middle of the bit the fibres usually have a back-and-forth bend as indicated. The metal in this part of the bit has no direction of least resistance in which to flow, and consequently pushes down in all directions, resulting in what might be aptly termed a crumbling of the grain of the steel.

At the edges of the bit where the metal can flow outwardly under the force of the press or hammer the fibres tend to bend outwardly, but there is no regularity to this bending and the uniform texture and density of the bit is completely destroyed. Particularly the bit is considerably weakened at the corners where the impact in drilling operations, is, as explained, above the heaviest.

The uniform density of the texture of the steel across the cutting face greatly facilitates obtaining a cutting surface of uniform hardness and wear-resisting qualities. It permits uniform heating as well as cooling of the cutting face in the hardening operation, and as the cutting face is throughout transverse to the fibres of the metal it will wear much more uniformly than where the grain structure of the metal is distorted by the forging operation. The bits may consequently be used effectively until their cutting edges are dull throughout their entire extent.

As stated above, the type of bit shown in the drawing is selected merely for illustration and the invention is not limited to this particular shape of bit or to the particular shape of bar stock herein disclosed, and the appended claims are intended to cover all such modifications thereof as fall properly within their scope.

I claim:

1. A detachable rock bit comprising a cylindrical body portion having an axial bore threaded at one end for attachment to a drill rod, radial wings projecting from said cylindrical body portion at the end opposite that threaded for attachment to a drill rod, said wings diverging outwardly from said body portion, hardened cutting edges formed on the transverse faces of said wings and the contiguous end surface of the body portion, said bit being composed of steel and having the fibres thereof, throughout the body and wing portions, extending substantially parallel and in a generally axial direction but with the fibres of the wing portions diverging toward the cutting face of the bit.

2. A detachable rock bit comprising a cylindrical body portion having an axial bore threaded at one end for attachment to a drill rod, radial wings projecting from said cylindrical body portion at the end opposite that threaded for attachment to a drill rod, said wings diverging outwardly from said body portion, hardened cutting edges formed on the transverse faces of said wings and the contiguous end surface of the body portion, said bit being composed of steel and having the fibres thereof, throughout the body and wing portions, extending substantially parallel and in a generally axial direction.

3. The method of making a detachable rock bit which comprises rolling a bar of steel to form spaced substantially cylindrical portions with radially projecting wing portions intermediate said cylindrical portions, the radii of said wing portions gradually increasing to a maximum, and from the maximum radius gradually decreasing to the next cylindrical portion, whereby the fibres of the steel throughout the bar, including the wing portions, extend substantially parallel and in a generally axial direction, dividing said bar transversely at points intermediate said wing portions and at the points of the maximum radius of said wing portions, forming an axial bore, threaded at one end for attachment to a drill rod, in sections thus formed, and forming hardened cutting edges on the transverse faces of the wings and the contiguous end surface of the body portion of said sections.

WALTER C. REA.